July 1, 1969 J. M. STEINKE 3,452,613
INTERMITTENT ROTARY MOTION TRANSMISSION
Filed Jan. 2, 1968

INVENTOR
JAMES M. STEINKE
BY Louis A. Kline
Albert L. Ely
Elmer Nargo
HIS ATTORNEYS

INVENTOR
JAMES M. STEINKE
BY
HIS ATTORNEYS

United States Patent Office
3,452,613
Patented July 1, 1969

3,452,613
INTERMITTENT ROTARY MOTION TRANSMISSION
James M. Steinke, Fairport, N.Y., assignor to The National Cash Register Company, Dayton, Ohio, a corporation of Maryland
Filed Jan. 2, 1968, Ser. No. 694,993
Int. Cl. F16h 35/02, 27/04
U.S. Cl. 74—393                  7 Claims

ABSTRACT OF THE DISCLOSURE

An intermittent rotary motion device having an input shaft and a cam member which is rotated therewith at a constant velocity. A carrier having toggle members thereon is rotated in an opposite direction from said input shaft. Connecting means, including gear portions in one modification and tangentially operating levers in a second modification, are used to connect the toggle members to the output shaft. As the carrier and the cam member are rotated in opposite directions, the toggle members are oscillated, and, in being oscillated, they alternately add a motion component to the input rotary motion and subtract a motion component from said input motion to produce a predetermined number of dwells in the output shaft for each complete revolution of the input shaft.

Background of the invention

This invention relates to a motion transmission device which produces intermittent rotary motion from a source of constant velocity rotation.

In data-processing equipment, there are operations which require intermittent feeding of tapes, printing paper, and documents. Frequently the devices used in generating the intermittent motion necessary are expensive to build and maintain. Applicant's device is simple and inexpensive to construct, and is practically maintenance-free. The device is versatile in that its dwell characteristics can be conveniently changed to suit particular design requirements.

A prior-art intermittent motion device is shown in United States Patent No. 3,302,472, which issued Feb. 7, 1967, on the application of Winston F. Williams. The device shown in that patent does not have the versatility of applicant's device, nor does it appear to be capable of attaining the output speeds of applicant's device, which are due to applicant's specific construction.

Summary of the invention

The motion-transmitting device of this invention produces an intermittent rotary motion from a source of constant velocity rotary motion. The device includes an input shaft and an output shaft which are rotatably mounted in a frame means and which shafts are in axial alignment with each other. A cam member having a cam lobes on the periphery thereof is fixed to the input shaft to be rotated thereby at a constant velocity. The device also includes a carrier means having an axis of rotation which is coincident with the axis of the input shaft and which carrier means is rotated in a direction which is opposite to the direction of rotation of the input shaft. Toggle means are rotatably mounted on the carrier means and have members in operative engagement with the lobes on the cam member, so that the toggle means are oscillated as the cam member and the carrier means are rotated in opposite directions. Connecting means are used to connect the toggle means to an output member which is fixed to the output shaft. When the input shaft is rotated in one direction, the carrier means is rotated in the opposite direction, and the toggle members, in oscillating, alternately produce a motion component which adds to the input motion and subtracts from the input motion to produce a predetermined number of dwells in the output shaft for each complete revolution of the input shaft.

Brief description of the drawings

FIG. 1 is an exploded view, in perspective, of a first embodiment of the intermittent motion device 10 of this invention, showing the general arrangement of the various elements thereof. The device includes an input shaft 12, which is rotatably mounted in a conventional compound bearing 14, which is fixed to the end plate 16. The end plate 16, the end plate 18, and the tubular housing member 20 are secured together by fasteners 22 to form the general frame means for the device shown in assembled form in FIG. 2.

Figure 1:
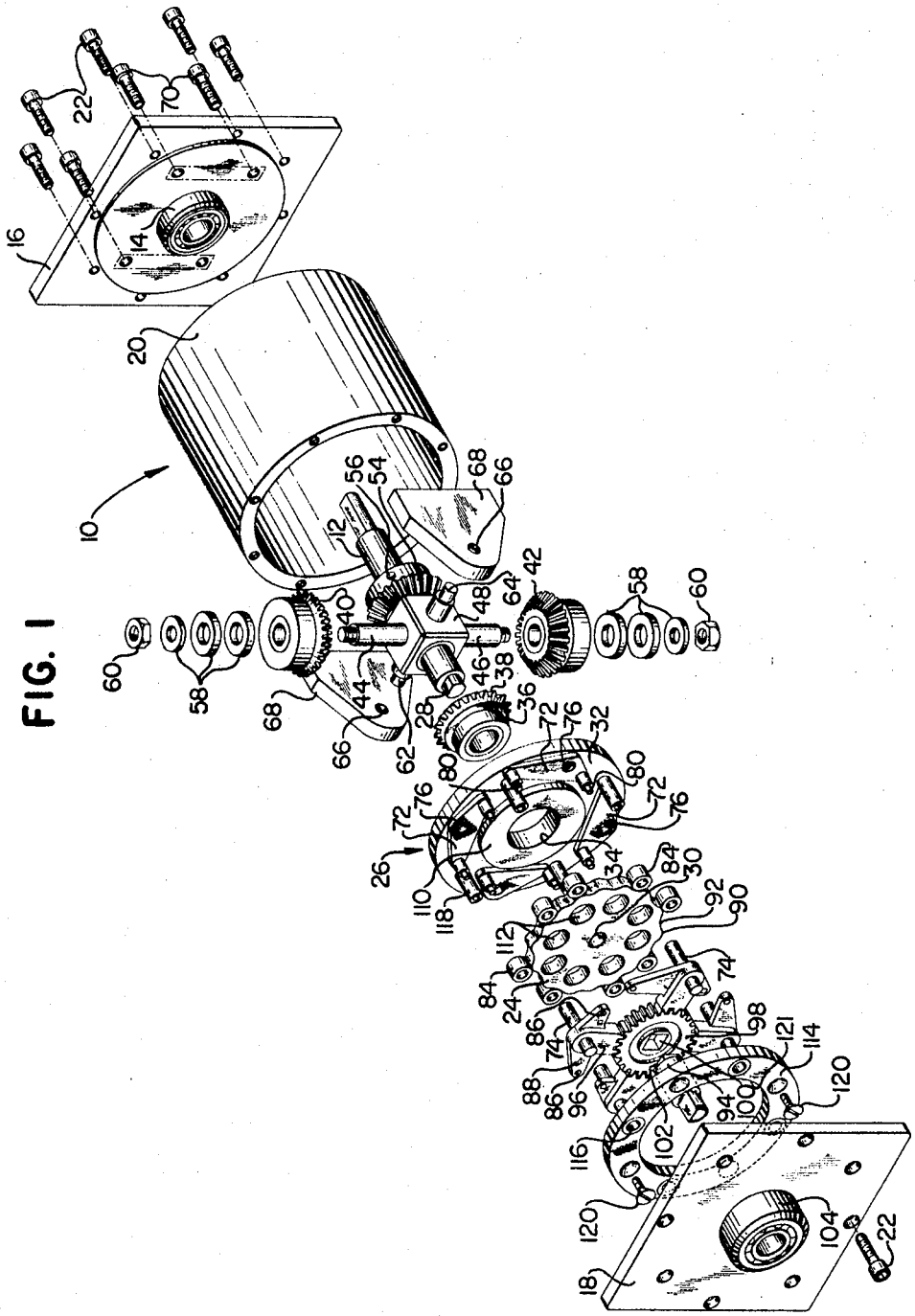
FIG. 1 is an exploded view, in perspective, of one embodiment of the invention showing the general arrangement of the parts thereof.
Figure 2:
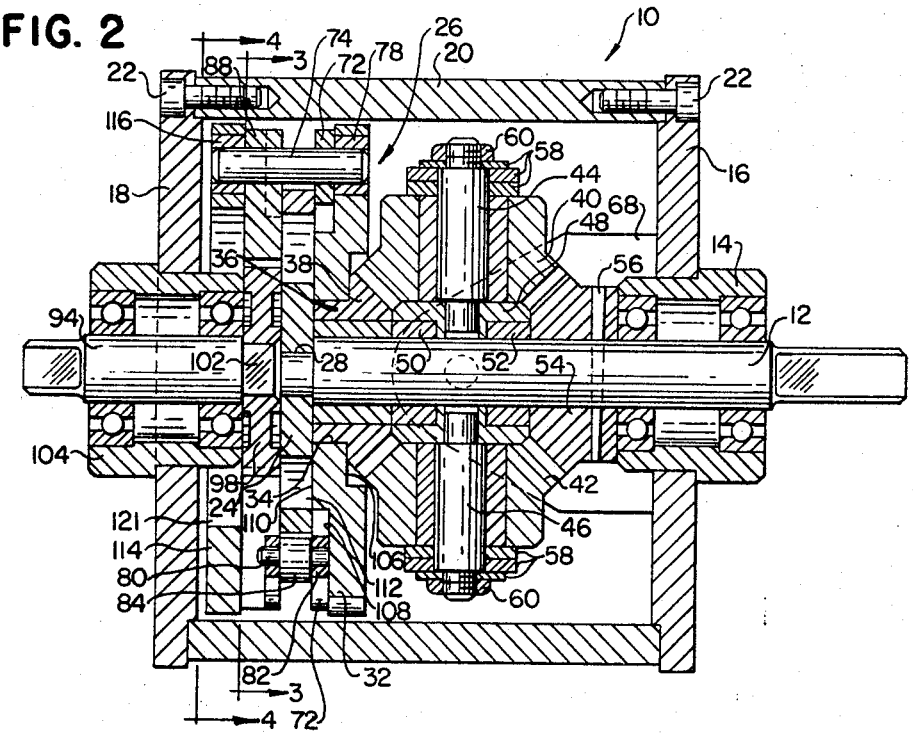
FIG. 2, on the sheet with FIG. 5, is a cross-sectional view, in assembled form, of the embodiment shown in FIG. 1 and is taken along the line 2—2 of FIG. 3.

The device 10 includes a cam member 24 and carrier means 26, which are rotated in opposite directions by the input shaft 12 by the construction best shown in FIGS. 1 and 2. The interior end of the shaft 12, having a flat surface 28 on its periphery, fits into a complementary opening 30 in the cam member 24 to enable the cam member to be rotated by the shaft 12. The carrier means 26 includes a disc member 32 having an aperture 34 in its center to receive the shank portion 36 of a bevel gear 38, which is fixed to the disc member 32. The gear 38 is rotatably mounted on the shaft 12 and is in mesh with bevel gears 40 and 42 (identical to the gear 38), which are rotatably mounted on diametrically positioned shafts 44 and 46, respectively. These shafts 44 and 46 are secured to and extend from a block 48, which is rotatably mounted on the input shaft 12 via bushings 50 and 52 (FIG. 2). A fourth bevel gear 54 (identical to the gear 38) is positioned opposite the gear 38 and is fixed by the pin 56 to rotate with the input shaft 12. The bevel gears 40 and 42 are retained on their associated shafts 44 and 46, respectively, by washers 58 and nuts 60. The block 48 is constrained against rotating on the shaft 12 by the diametrically positioned studs 62 and 64, which extend from opposite sides of the block 48 and whose free ends fit into apertures 66 is spaced, parallel supports 68, which are secured to the end plate 16 by fasteners 70. When the input shaft 12 is rotated in one direction, it rotates the carrier means 26 in the opposite direction by the drive means including the bevel gears 54, 40, 42, and 38, just described.

The carrier means 26 (FIGS. 1 and 2) carries a plurality of toggle members 72, which are oscillated by a coaction with the cam member 24 as follows. The toggle members 72 are all identical, and each is rotatably mounted on the carrier means 26 by a pin 74 passing through an aperture 76 in the center thereof. The pin 74 is rotatably mounted in a bushing 78 (FIG. 2) fixed in the carrier means 26. The axes of rotation of the pins 74 lie on an imaginary circle which is concentric with the aperture 34 and are equally spaced along the perimeter of said circle. Each toggle member 72 has two pins 80 passing therethrough, which are equidistantly spaced from the axis of their associated aperture 76, and the pins extend towards the cam member 24. One end of each pin 80 is rotatably mounted in a bushing 82 (FIG. 2), which is fixed to the toggle member 72, and a follower or roller 84 is rotatably mounted on the pin 80 between the ends thereof prior to inserting the remaining end of the pin into an aperture 86 in a gear sector member 88, which is fixed to the pin 74 to rotate therewith. The rollers 84 of each toggle member are in engagement with the periphery of the cam member 24, which has a plurality of equally-spaced, identically-shaped lobes 90 and valleys 92 thereon and which are so arranged that, when one roller 84 of each toggle member 72 engages the apex of a lobe, the remaining roller thereon engages the lowest point of a valley 92. When the input shaft 12 is rotated in one direction, the toggle members 72 are rotated in the opposite direction (about the axis of the shaft 12) due to their being carried by the carrier means 26, and, in addition, the toggle members are oscillated due to their coaction with the periphery of the cam member 24.

The connecting means for operatively connecting the toggle members 72 with the output shaft 94 is constructed as follows. Each gear sector member 88 associated with each toggle member 72 has thereon a gear portion 96, which is in mesh with an output gear 98 (FIGS. 1, 2, 3, and 4). The output gear 98 has a square opening 100 (FIG. 1) at its axis of rotation to receive the square end 102 of the shaft 94 to form the driving connection therebetween. The output shaft 94 is axially aligned with the input shaft 12 and is rotatably supported in a conventional compound bearing 104 (best shown in FIGS. 1 and 2), which is fixed in the end plate 18. As the input shaft 12 is rotated counter-clockwise, as viewed in FIG. 1, the cam member 24 will also be rotated counter-clockwise; however, the carrier means 26 will be rotated clockwise. As the carrier means rotates clockwise, the rotation of the toggle members 72 relative to the axis of rotation of the carrier means 26 rotates clockwise, the rotation of the sector members 88 of each toggle member 72 will impart a first component of motion to the output gear 98, which will also be clockwise. Because the gear sector members 88 are also being oscillated about the axis of rotation of the pin 74 by the coaction with the cam member 24, a second component of motion will be contributed by the toggle members 72. Part of the time, this second component of motion will "add" to the clockwise rotation of the output gear 98, and part of the time it will "subtract" from said rotation. The geometry of the device 20 is so designed that the oscillatory motion of the gear sector members 88 when "subtracting" will offset the motion of the carrier means 26 in the clockwise direction, so that the net effect of the two components of motion is to cancel each other, resulting in a dwell in the output gear 98 and the output shaft 94 attached thereto. During the time that the second component of motion "adds" to the first component of motion, the angular velocity of the output gear 98 will reach a peak which is twice that due to the rotation of the carrier means 26 alone. The rise and fall sides adjacent each lobe 90 are complementary, so that the rollers 84 of each toggle member 72 are constantly in contact with the periphery of the cam member 24. In the embodiment shown, the lobes 90 were designed to provide a cam rise according to simple harmonic motion, although other rises such as cycloidal, linear, or polynomial may be designed for a particular application, as, for example, when the dwell time needs to be changed.

Additional construction details relating to the embodiment shown in FIGS. 1 through 4 are as follows. The disc member 32 has an annular recess 106 (FIG. 2) on one side thereof to provide clearance for the bevel gear 38, and also has an annular recess 108 on the opposite side thereof to provide clearance for the toggle members 72, enabling the face 110 of the disc member 32 to slidingly engage the adjacent face of the cam member 24. The cam member 24 has a plurality of identical holes 112 equally spaced from the perimeter thereof to reduce its inertia when rotating. The toggle members 72 are additionally supported on the carrier means 26 by the apertured disc 114, which has a plurality of bearings 116 retained therein and aligned with the pins 74. One end of each pin 74 is rotatably mounted in its associated bearing 116 (FIG. 2), while the other end is rotatably mounted in its associated bearing 78, as previously explained. The apertured disc 114 is held in spaced, parallel relationship with the disc member 32 by spacer studs 118 (FIG. 1). Each stud 118 is secured at one end to the disc member 32 and is threaded at the other end to receive a fastener 120, which secures the apertured disc 114 to the disc member 32. The apertured disc 114 has its opening 121 sufficiently large to permit the bearing 104 to pass therethrough, as is best shown in FIG. 2.

Figure 5:
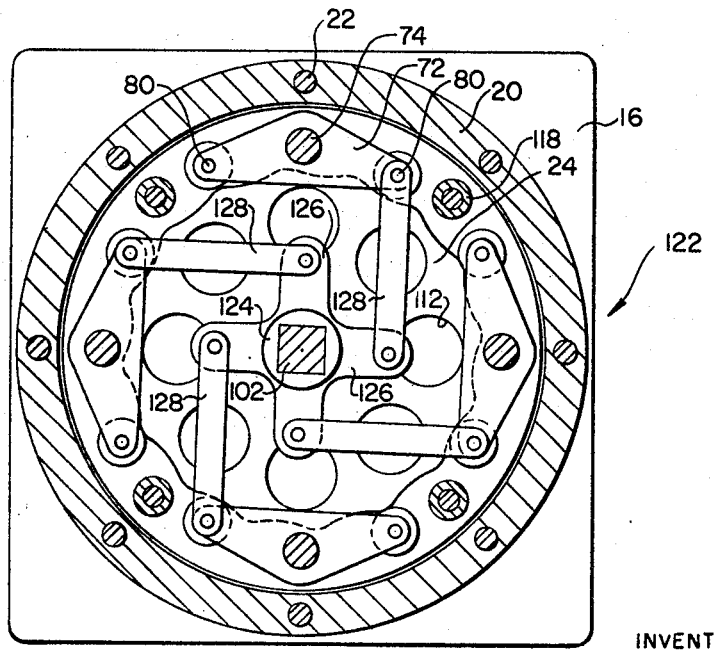
FIG. 5, on the sheet with FIG. 2, is an elevational view similar to FIG. 3, showing a second embodiment of the invention in which the connecting means for operatively connecting the toggle members with the output shaft includes tangentially operating levers, and is also taken along the line 3—3 of FIG. 2.
Figure 4:
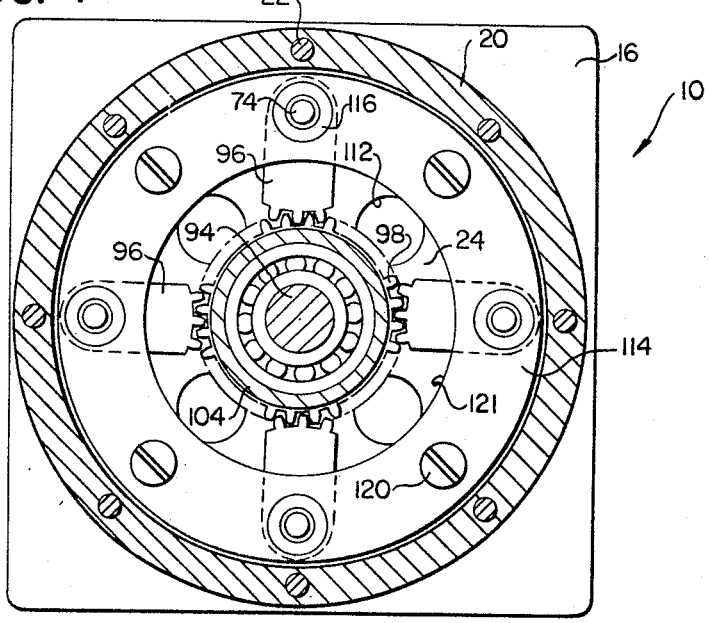
FIG. 4 is an elevational view similar to FIG. 3, showing some of the means for supporting the toggle members, and is taken along the line 4—4 of FIG. 2.
Figure 3:
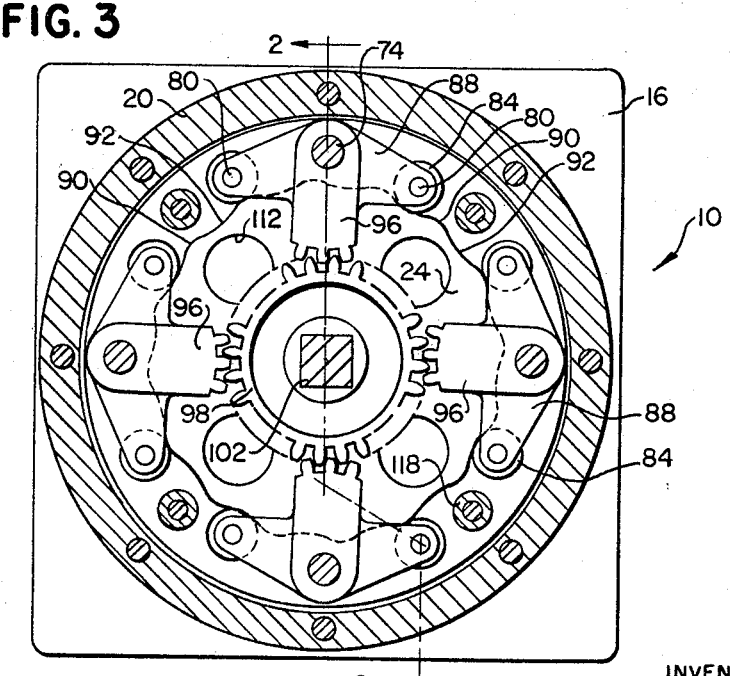
FIG. 3 is an elevational view, partly in cross-section, and is taken along line 3—3 of FIG. 2 and shows one arrangement of the connecting means (gear segments) operatively connecting the toggle members with the output shaft.

FIG. 5 shows a second modification of the intermittent motion device, which is designated generally as 122 and which is identical to the first embodiment of the device 10 except as follows. Instead of using a geared output member (like 98 of FIG. 3), the output member 124 shown in FIG. 5 is fixed to the square end 102 of the output shaft 94 and has identical arms 126 extending radially outwardly from the rotating axis thereof. Each toggle member 72 is operatively connected to the output member 124 by a link 128 having one end pivotally joined to an arm 126 and the other end pivotally joined to one end of the toggle member 72. In the embodiment shown, the arms 126 are positioned ninety degrees apart from one another, and the links 128, which are identical to one another, are arranged to operate tangentially on the output member 124. Each link 128 is substantially perpendicular to its associated arm 126 and to an imaginary line joining the axes of the pins 80 (FIG. 5) of its associated toggle member.

In both embodiments 10 and 122 of the invention, the number of lobes on the cam member 24 is sixteen, although the number can be changed to suit particular design requirements. When the rise and fall surfaces of the cam member 24 are designed with harmonic motion characteristics, the approximate dwell time is approximately sixteen percent of the total step cycle time regardless of the number of lobes on the cam member 24. With an input rotational speed to the shaft 12 of about 938 r.p.m., the output shaft 94 will experience thirty-two steps per revolution of the input shaft at two milliseconds per step. A feature of this invention is that the input rotational velocity is the same as the average rotational velocity of the output shaft which experiences the dwells. This invention can conveniently produce dwells ranging up to sixty-four per complete revolution of the output shaft.

While the forms of mechanism shown and described herein are admirably adapted to fulfill the purpose of the invention, it is to be understood that it is not intended to confine the invention to the forms or embodiments disclosed herein, for it is susceptible of embodiment in various other forms.

What is claimed is:
1. An intermittent motion device comprising:
   a frame means;
   an input shaft and an output shaft rotatably mounted in said frame means;
   carrier means rotatably mounted for concentric rotation relative to said input shaft;
   drive means for rotating said carrier means in a direction which is opposite to the direction of rotation of said input shaft;

toggle means rotatably mounted on said carrier means;
a cam member fixed to rotate with said input shaft and having a plurality of lobes on the periphery thereof;
said toggle means having followers in operative engagement with said lobes;
said output shaft having an output member fixed to rotate therewith;
and connecting means operatively connecting said toggle means with said output member;
said toggle means being oscillated by said cam member when said input shaft is rotated so as to produce an intermittent rotary motion in said output shaft having a predetermined number of dwells for one complete revolution of said input shaft.

2. The device as claimed in claim 1 in which the planes of rotation of said carrier means, said cam member, and said toggle means are parallel to one another; and in which said cam member is positioned between said carrier means and said output member.

3. The device as claimed in claim 1 in which said connecting means includes gear portions on said toggle means; said output member being a gear in mesh with said gear portions of said toggle means.

4. The device as claimed in claim 3 in which said toggle means comprises a plurality of toggle members with the axis of rotation of each said toggle member being parallel to the axis of rotation of said output shaft and lying on the circumference of a circle which is concentric with said carrier means, each said toggle member being rotatably supported on said carrier means; and each said toggle member having one of said gear portions.

5. The device as claimed in claim 4 in which said drive means includes:
a first bevel gear fixed to rotate with said input shaft;
a second bevel gear rotatably mounted on said input shaft and fixed to rotate with said carrier means; and
a third bevel gear in mesh with said first and second bevel gears.

6. The device as claimed in claim 1 in which said connecting means include at least one link which is pivotally joined at one end thereof to said toggle means and pivotally joined at the other end thereof to said output member so as to operate substantially tangentially between said toggle means and output member.

7. The device as claimed in claim 2 in which:
said toggle means comprises a plurality of toggle members with the axis of rotation of each said toggle member being parallel to the axis of rotation of said output shaft and lying on the circumference of a circle which is concentric with said carrier means; each said toggle member being rotatably supported on said carrier means;
said output member has a plurality of axially aligned holes equally spaced from the axis of rotation thereof;
and said connecting means includes a link for each said toggle member, each said link being pivotally joined to one end of its associated toggle member and said output member at one of said holes so as to operate substantially tangentially on said output member.

References Cited

UNITED STATES PATENTS

| | | | |
|---|---|---|---|
| 1,791,698 | 2/1931 | Armitage et al. | 74—679 |
| 2,816,458 | 12/1957 | Castrow | 74—679 |
| 3,138,960 | 6/1964 | Moo | 74—393 X |

ARTHUR T. McKEON, *Primary Examiner.*

U.S. Cl. X.R.

74—84

UNITED STATES PATENT OFFICE
CERTIFICATE OF CORRECTION

Patent No. 3,452,613                                July 1, 1969

James M. Steinke

It is certified that error appears in the above identified patent and that said Letters Patent are hereby corrected as shown below:

Column 3, line 42, after "carrier means" insert -- 26 --; line 44, "rotates clockwise, the rotation of the" should read -- will also be clockwise, and the gear --.

Signed and sealed this 21st day of April 1970.

(SEAL)
Attest:

Edward M. Fletcher, Jr.                        WILLIAM E. SCHUYLER, JR.
Attesting Officer                                        Commissioner of Patents